United States Patent Office 3,621,821
Patented Nov. 23, 1971

3,621,821
ARRANGEMENT FOR STRATIFYING THE FUEL CHARGE IN SPARK-IGNITION ENGINES
Stanislaw Jarnuszkiewicz, Swierczewskiego 29/8, Krakow, Poland
Filed July 8, 1969, Ser. No. 839,850
Claims priority, application Poland, July 17, 1968, P 128,168
Int. Cl. F02m 63/02
U.S. Cl. 123—32 ST     7 Claims

ABSTRACT OF THE DISCLOSURE

An internal combustion engine has a cylinder, spark plug and fuel injector apparatus which directs fuel near to the spark plug at low loads and further from the spark plug at high loads. In one embodiment, two orifices are provided, one directed near the spark plug and the other further from the spark plug; fuel may be supplied to either or both. In another embodiment, the injector apparatus including a dirigible injector is provided.

---

The present invention relates to an arrangement for stratifying the fuel charge for internal combustion engines with spark ignition. The arrangement may be adapted to both conventional piston engines and rotary piston engines with hydraulic or pneumatic injection.

Heretofore the stratifying of the fuel charge and a partial qualitative adjustment have been obtained by swirling the air in a combustion chamber of suitable form, the stream of atomized fuel being injected at a suitable angle. By using such a system it appears impossible to reach the qualitative adjustment over the full range of loading, and so the swirling of the air causes a decrease in the efficiency of the charging, this being the cause of engine power output loss. Other systems of engines with spark ignition make use of fuel injection at high pressure, with injection occurring just before the point of ignition to obtain stratifying of the fuel charge and the qualitative adjustment. In that case the fuel stream flows in the vicinity of the spark plug, being subjected to ignition. The disadvantage of such systems is the expensive system of high pressure injection necessary to cause the very fine atomizing of fuel and lack of a complete utilization of combustion air, which in turn decreases the unitary power output of the engine.

The present invention is free of the above noted disadvantages because the stratification of the fuel charge and the qualitative adjustment take place over the entire load range, without drop of the unitary power output of the engine, accomplished through use of less expensive hydraulic or pneumatic injection systems. The injection takes place at the compression stroke and the absence of the necessary air swirling results in high average usable pressure being obtained.

The purpose of the invention is to provide stratifying of the fuel charge in the engine combustion chamber necessary for the qualitative adjustment, reduction of the fuel consumption and reduction of the toxicity of combustion gases by using low pressure hydraulic fuel injection or pneumatic injection.

The said problem has been solved by design of a system for stratifying the fuel charge for the engines with spark ignition, according to the invention. The essence of the invention consists in that the stream direction of the injected fuel is variable during the operation of the engine, so that the fuel drops impinge on the walls of the combustion chamber at a smaller or greater distance from the spark plug, depending on the load on the engine.

At lower engine loadings the stream of atomized fuel is directed closer towards the spark plug, but when the engine loading increases the stream is moved further away from the spark plug. In such a way it is possible to move the stream of a rich combustible mixture nearer or further from the spark plug, thus getting the required qualitative adjustment.

Figure 1:
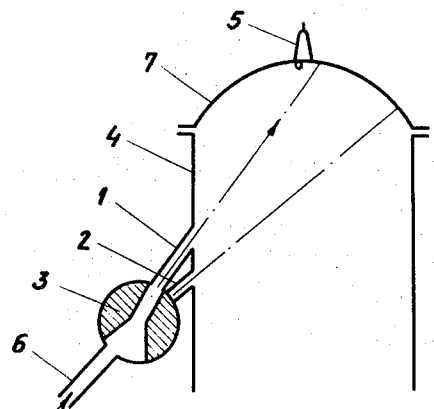

The arrangement according to the invention is shown in an exemplary embodiment in the accompanying drawings. FIG. 1 is a diagrammatic illustration of the invention including a pneumatic injection system with fixed divergent orifices, FIG. 2 is similar with the engine running at medium speed, FIG. 3 shows the engine running at full load, FIG. 4 represents a modification of the invention with a hydraulic injection system with fixed parallel injectors, and FIG. 5 shows a modification of the invention with a dirigible injector.

Figure 2:
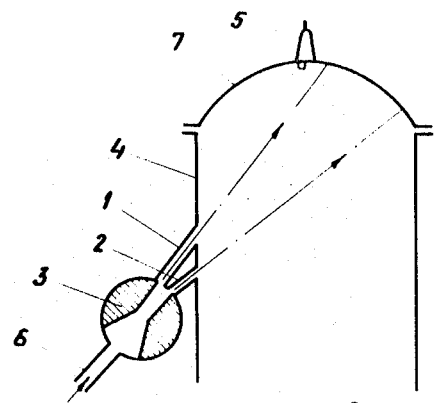
Figure 3:
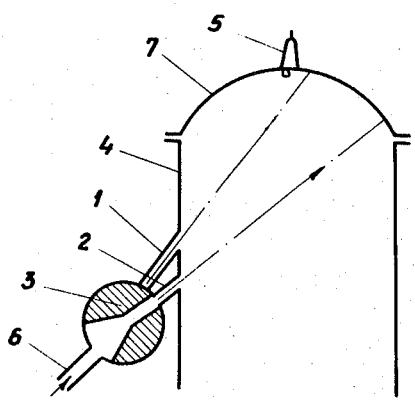
Figure 4:
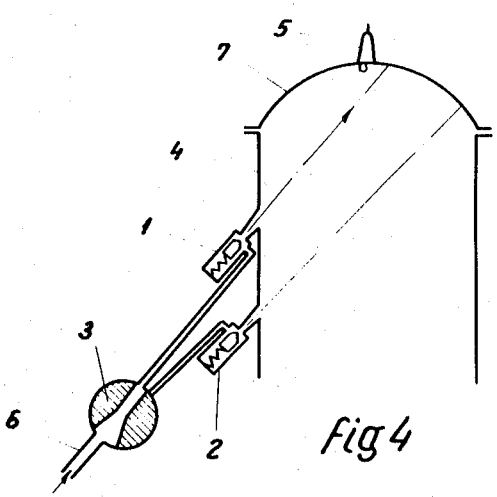

The arrangement according to the invention as shown in FIGS. 1–4 has at least two orifices 1 and 2 in the cylinder wall 4, the axis of the injection from the orifice 1 passing near the spark plug 5, whereas that of the orifice 2 is further away from the spark plug 5. Both orifices 1 and 2 are connected with a fuel supply pipe 6 by means of a valve gear 3. In the embodiment of FIGS.1–3, the axes of the orifices in the cylinder are divergent, and the fuel supply is pneumatic, while in FIG. 4, the orifices are substantially parallel and the fuel supply is hydraulic.

Figure 5:
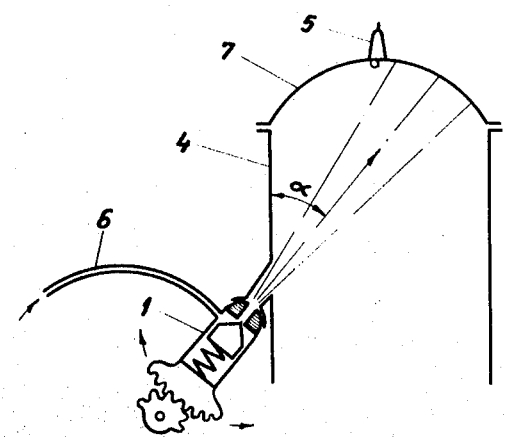

Another modification of the invention as shown in FIG. 5 has a dirigible injector 1 fitted on the cylinder case 4 and the injection axis position (alpha angle) of said injector may be varied relative to the cylinder axis 4, so that the injected air stream falls on the combustion chamber walls 7 at different distances from the spark plug 5, in dependence on the loading of the engine, forming thus the rich mixture area more or less distant from the spark plug 5.

The operation of the arrangement according to the invention is as follows:

At operation with low engine load the gas affecting the injection, together with the fuel drops, is at the moment of injection fed by the supply pipe 6 and hence directed through the valve gear 3 to the injection orifice 1, the axis of the injected stream being directed close to the spark plug 5. The drops form on the combustion chamber walls 7 a local draining area of rich mixture in the vicinity of the spark plug 5. In this way even small quantities of evaporating fuel are subject to ignition. When the engine is running at intermediate load as shown in FIG. 2, the valve gear 3 takes an intermediate position thus directing the gas with fuel into both injection orifices 1 and 2, forming two streams, the vicinity of the spark plug 5 being reached by a relatively smaller fuel quantity. When there is full load on the running engine as shown in FIG. 3, the valve gear 3 takes such a position that the injecting gas is directed into the injection orifice 2, the drops of the injected fuel, in a greater quantity, falling on the combustion chamber walls 7 at a further distance from the spark plug 5, so that in the vicinity of the spark plug 5 the mixture is most inflammable.

What I claim is:

1. In combination with an internal combustion engine cylinder having a spark plug,
    means spaced from said spark plug for injecting fuel into said cylinder, said means comprising means providing first and second orifices in said cylinder, each orifice having an axis, the axis of the first orifice passing near to said spark plug and the axis of the second orifice passing further from said spark plug, and means for supplying fuel to either one of or to both of said orifices.

2. The combination of claim 1, wherein said orifices have divergent axes.

3. The combination of claim 1, wherein said orifices have parallel axes.

4. The combination of claim 1, and a fuel supply conduit, said last mentioned means comprising valve gear means for connecting either or both said orifices to said fuel supply conduit.

5. The combination of claim 1, said last mentioned means comprising dirigible fuel directing means.

6. The combination of claim 1, said fuel injecting means being pneumatic injection means.

7. The combination of claim 1, said fuel injection means being hydraulic injection means.

References Cited

UNITED STATES PATENTS

| | | | |
|---|---|---|---|
| 1,624,413 | 4/1927 | Huber | 123—32.7 |
| 2,229,552 | 1/1941 | Cowardin et al. | 123—32.6 |
| 2,246,019 | 6/1941 | Steinlein | 123—32 |
| 2,595,915 | 5/1952 | Barber | 123—32 |
| 2,627,254 | 2/1953 | Juhasz | 123—32 |
| 2,717,582 | 9/1955 | Scherenberg | 123—32 |
| 1,448,745 | 3/1923 | Hobart et al. | 123—32.7 |

LAURENCE M. GOODRIDGE, Primary Examiner

U.S. Cl. X.R.

123—32 H, DIG. 4